United States Patent
Salter et al.

(10) Patent No.: US 10,377,300 B1
(45) Date of Patent: Aug. 13, 2019

(54) VEHICLE RUNNING BOARD ASSEMBLY (71) Applicant: Ford Global Technologies, LLC, Dearborn, MI (US)

(72) Inventors: Stuart C. Salter, White Lake, MI (US); Kamal Bhojwani, Ann Arbor, MI (US); Phani Shashank Vuttaluru, Royal Oak, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/957,121

(22) Filed: Apr. 19, 2018

(51) Int. Cl.
*B60R 3/00* (2006.01)
*B60Q 1/32* (2006.01)
*B60R 3/02* (2006.01)

(52) U.S. Cl.
CPC .............. *B60Q 1/323* (2013.01); *B60R 3/002* (2013.01); *B60R 3/02* (2013.01)

(58) Field of Classification Search
CPC .................................. B60R 3/002; B60R 3/02
USPC ...................................... 280/163, 164.1, 166
See application file for complete search history.

(56) References Cited

U.S. PATENT DOCUMENTS

| 4,463,962 | A | * | 8/1984 | Snyder | B60R 3/002 280/164.1 |
|---|---|---|---|---|---|
| 4,557,494 | A | * | 12/1985 | Elwell | B60Q 1/323 24/514 |
| 4,819,136 | A | * | 4/1989 | Ramsey | B60Q 1/2615 362/267 |
| 4,838,567 | A | * | 6/1989 | Michanczyk | B60R 3/002 280/163 |
| 4,965,704 | A | * | 10/1990 | Osborne, Sr. | B60Q 1/323 362/249.01 |
| 4,985,810 | A | * | 1/1991 | Ramsey | B60Q 1/2615 362/267 |
| RE34,275 | E | * | 6/1993 | Ramsey | B60Q 1/2615 362/267 |
| 5,806,869 | A | * | 9/1998 | Richards | B60R 3/002 280/163 |
| 5,848,837 | A | * | 12/1998 | Gustafson | B64F 1/002 362/235 |
| 5,915,830 | A | * | 6/1999 | Dickson | B60R 3/002 362/495 |
| 6,179,454 | B1 | * | 1/2001 | Hoines | B60Q 1/323 362/495 |
| 6,190,027 | B1 | * | 2/2001 | Lekson | B60Q 1/323 313/512 |
| 6,203,040 | B1 | * | 3/2001 | Hutchins | B60R 3/002 182/90 |

(Continued)

FOREIGN PATENT DOCUMENTS

| TW | M248673 U | 12/1992 |
|---|---|---|
| TW | M250836 U | 1/1993 |
| WO | 02053416 A2 | 7/2002 |

*Primary Examiner* — Jeffrey J Restifo
(74) *Attorney, Agent, or Firm* — Vichit Chea; Price Heneveld LLP (57) ABSTRACT

A running board assembly of a vehicle is provided herein and includes a running board having two ends, each covered by an end cap having an optic. Two light sources are disposed inside the running board and are each located proximate a corresponding end cap. Each light source is operable to emit light toward the optic of the corresponding end cap based on a signal indicating a selected mode of the vehicle.

20 Claims, 4 Drawing Sheets

(56) References Cited

U.S. PATENT DOCUMENTS

| | | | | |
|---|---|---|---|---|
| 6,250,785 B1 * | 6/2001 | Mallia | B60Q 1/323 | 362/495 |
| 6,382,819 B1 * | 5/2002 | McQuiston | B60Q 1/323 | 362/487 |
| 6,466,128 B1 * | 10/2002 | Pan | B60Q 1/323 | 340/332 |
| 6,588,782 B2 * | 7/2003 | Coomber | B60R 3/002 | 280/163 |
| 6,604,834 B2 * | 8/2003 | Kalana | B60Q 1/30 | 362/84 |
| 6,659,629 B2 * | 12/2003 | Potter | B60Q 1/323 | 362/331 |
| 6,709,137 B1 * | 3/2004 | Glovak | B60Q 1/323 | 362/495 |
| 7,017,927 B2 * | 3/2006 | Henderson | B60R 3/002 | 280/163 |
| 7,347,597 B2 * | 3/2008 | French | B60D 1/60 | 280/164.1 |
| 7,377,563 B1 * | 5/2008 | Demick | B60R 3/02 | 280/164.1 |
| 7,588,357 B2 * | 9/2009 | Onopa | B60Q 1/323 | 362/485 |
| 7,621,546 B2 * | 11/2009 | Ross | B60R 3/02 | 280/163 |
| 7,834,750 B1 * | 11/2010 | Hertz | B60Q 1/2692 | 340/468 |
| 8,231,169 B2 * | 7/2012 | Leopold | B62D 25/02 | 280/164.1 |
| 8,602,431 B1 * | 12/2013 | May | B60R 3/02 | 280/163 |
| 8,702,284 B2 * | 4/2014 | Huang-Tsai | B60Q 1/323 | 362/249.02 |
| 9,162,614 B1 * | 10/2015 | Wang | B60Q 1/323 | |
| 9,333,919 B2 * | 5/2016 | Crandall | B60Q 1/323 | |
| 9,487,127 B2 * | 11/2016 | Salter | F21V 9/40 | |
| 9,487,128 B2 * | 11/2016 | Salter | B60R 3/002 | |
| 9,499,093 B1 * | 11/2016 | Salter | B60Q 1/323 | |
| 9,499,094 B1 * | 11/2016 | Dellock | B60Q 1/323 | |
| 9,539,937 B2 * | 1/2017 | Dellock | B60Q 1/323 | |
| 9,598,004 B2 * | 3/2017 | Yang | B60Q 1/323 | |
| 9,718,396 B2 * | 8/2017 | Wang | B60Q 1/323 | |
| 9,738,217 B1 * | 8/2017 | Bradley | B60Q 1/323 | |
| 9,783,100 B2 * | 10/2017 | Salter | H05B 33/0845 | |
| 9,802,545 B1 * | 10/2017 | Salter | B60R 3/002 | |
| 9,821,717 B1 * | 11/2017 | Dellock | B60Q 1/2661 | |
| 9,944,225 B1 * | 4/2018 | Chen | B60Q 1/2661 | |
| 9,963,066 B1 * | 5/2018 | Salter | B60Q 1/2615 | |
| 10,144,345 B2 * | 12/2018 | Stinson | H02J 50/10 | |
| 2017/0282787 A1 * | 10/2017 | Salter | B60Q 1/0011 | |

* cited by examiner

VEHICLE RUNNING BOARD ASSEMBLY

FIELD OF THE INVENTION

The present invention generally relates to a running board assembly of a vehicle, and more particularly, a retractable running board assembly having a built-in lighting feature.

BACKGROUND OF THE INVENTION

Some running board assemblies include built-in lighting. However, such lighting is often unsightly and is limited in functionality. Accordingly, there is a need for more sophisticated lighting having multiple uses. The present disclosure is intended to satisfy this need.

SUMMARY OF THE INVENTION

According to a first aspect of the present disclosure, a running board assembly of a vehicle is provided and includes a running board having two ends, each covered by an end cap having an optic. Two light sources are disposed inside the running board and are each located proximate a corresponding end cap. Each light source is operable to emit light toward the optic of the corresponding end cap based on a signal indicating a selected mode of the vehicle.

According to a second aspect of the present disclosure, a running board assembly of a vehicle is provided and includes a running board having two ends, each covered by an end cap having an optic. Two light sources are disposed inside the running board and are each located proximate a corresponding end cap. Each light source is operable to emit light toward the optic of the corresponding end cap based on a signal indicating a vehicle off-road mode.

According to a third aspect of the present disclosure, a vehicle lighting system is provided and includes a running board having two ends, each covered by an end cap having an optic. Two light sources are disposed inside the running board and are each located proximate a corresponding end cap. Each light source is operable to emit light toward the optic of the corresponding end cap. A controller is operably coupled to the light sources and is configured to operate the light sources based on a signal indicating a vehicle off-road mode. A user-input device is configured to generate the signal based on input specifying the vehicle off-road mode.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
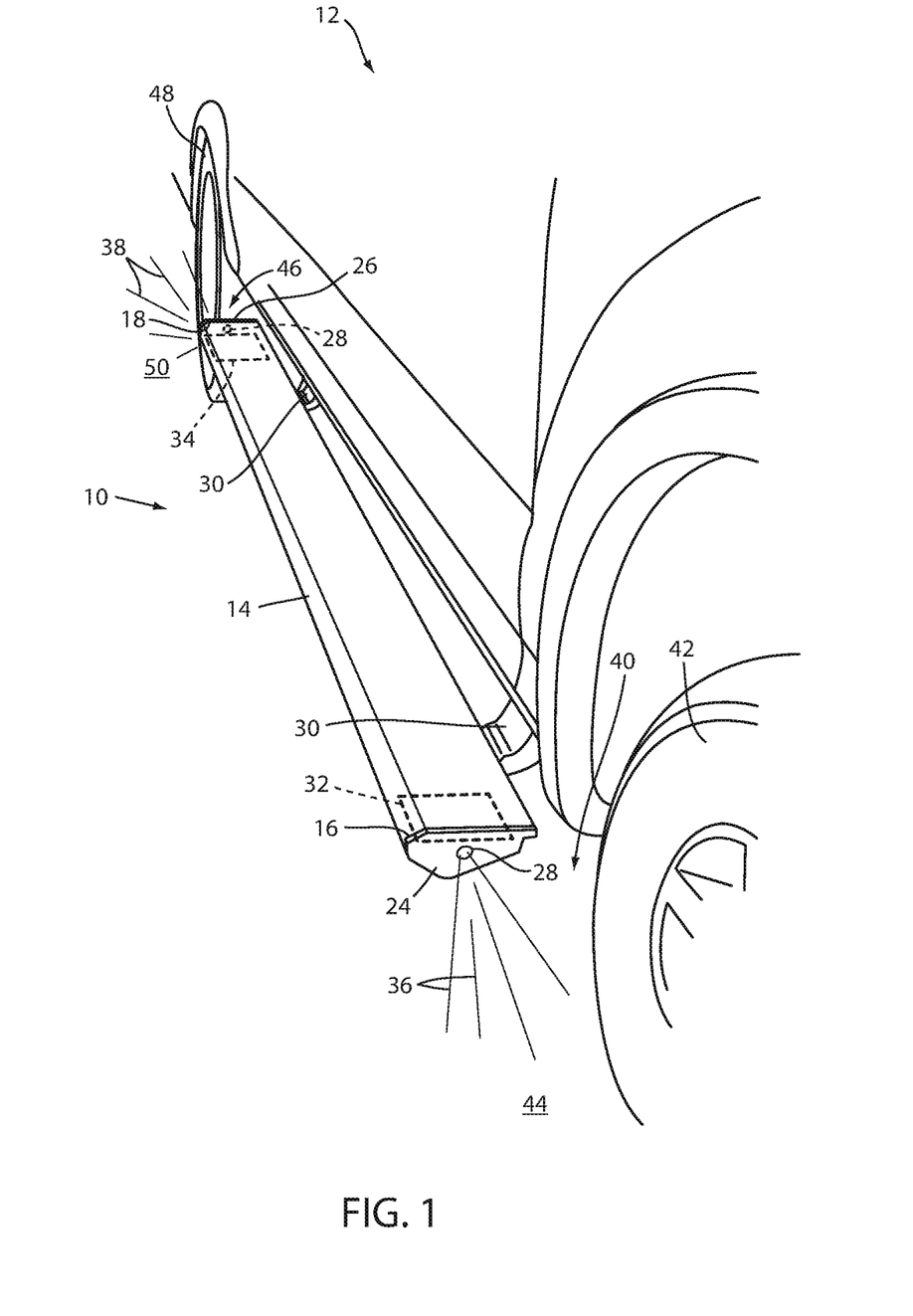
FIG. 1 is a partial side perspective view of a vehicle equipped with a running board assembly having a running board in a deployed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 2:
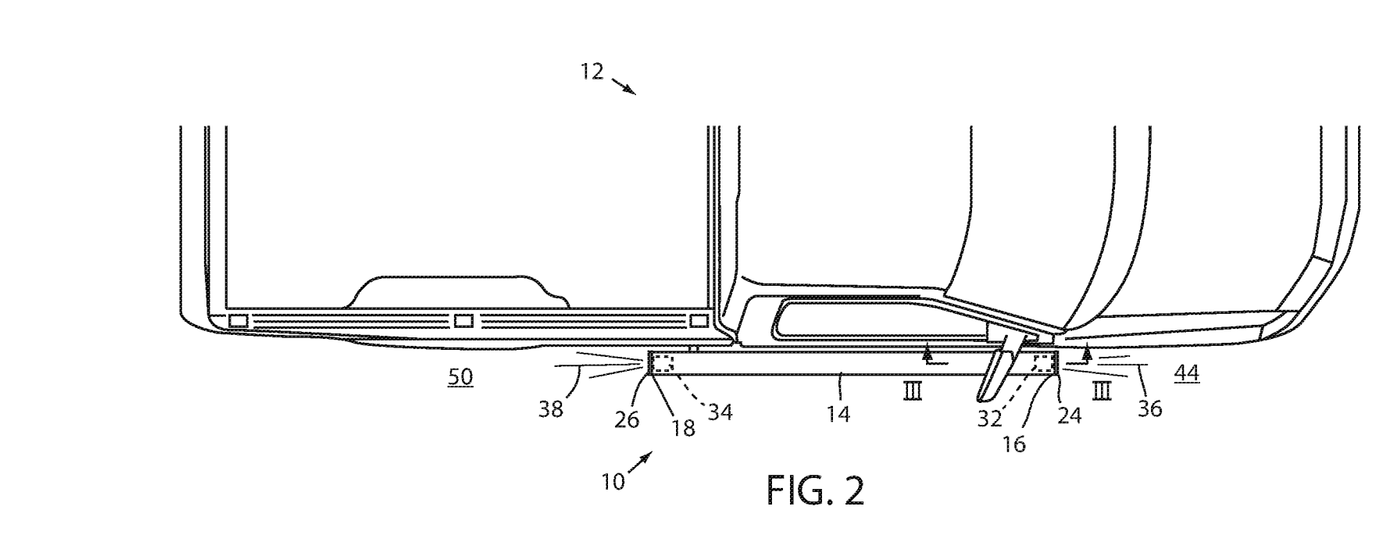
FIG. 2 is a partial top view of the vehicle and the running board assembly.

Referring to FIGS. 1 and 2, a running board assembly 10 of a vehicle 12 is shown. The running board assembly 10 includes a running board 14 having two ends 16, 18. The ends 16, 18 are opposite one another in a longitudinal direction of the running board 14. The running board 14 may be variously dimensioned and may include a plurality of step grooves (not shown for clarity). Each end 16, 18 is covered by an end cap 24, 26 having an optic 28 (FIG. 1) coupled thereto. The end caps 24, 26 may be configured as snap ons, thus being snappedly coupled to the ends 16, 18. Alternatively, the end caps 24, 26 may be otherwise coupled to the ends 16, 18 using mechanical fasteners, adhesives, or other joining means. The end caps 24, 26 and its corresponding optics 28 may be constructed from polycarbonate or other material exhibiting resistance to impact and abrasion.

With continued reference to FIGS. 1 and 2, the running board 14 is shown in a deployed position, but is movable to a retracted position using one or more motorized arms 30. Two light sources 32, 34 are disposed inside the running board 14 and are each located proximate a corresponding end cap 24, 26. As shown, the light source 32 is located proximate the end cap 24 and the light source 34 is located proximate the end cap 26. The light sources 32, 34 are each operable to emit light toward the optic 28 (FIG. 1) of the corresponding end cap 24, 26. For purposes of illustration, light emitted from the light sources 32, 34 is represented by light rays 36 and 38, respectively.

In operation, light emitted from light source 32 is projected outward from the running board 14 in a vehicle-forward direction via the optic 28 of end cap 24. The emitted light serves to illuminate a front-vehicle wheel well area 40 in which a front tire 42 is located. The emitted light may also serve to illuminate a ground area 44 around the front tire 42. Light emitted from light source 34 is projected outward from the running board 14 in a vehicle-rearward direction via the optic 28 of end cap 26. The emitted light serves to illuminate a rear-vehicle wheel well area 46 in which a rear tire 48 is located. The emitted light may also serve to illuminate a ground area 50 around the rear tire 48.

Figure 3:
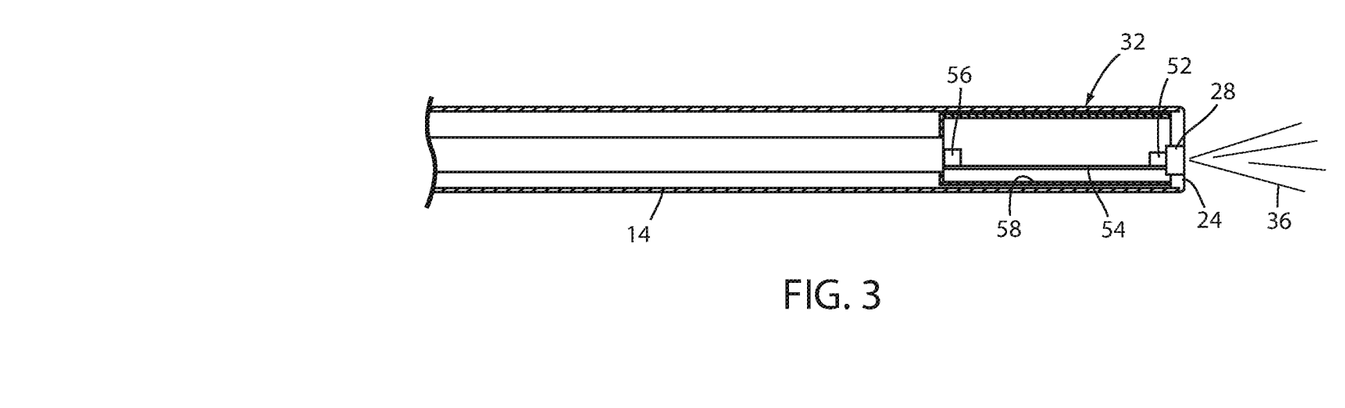
FIG. 3 is a cross-sectional view of the running board assembly taken along line of FIG. 2.

Referring to FIG. 3, the light source 32 is described in greater detail. However, it will be appreciated that the other light source 34 may be similarly configured and operated. With respect to the examples described herein, the light source 32 may each be configured to emit visible and/or non-visible light, such as blue light, UV light, infrared, and/or violet light and may include any form of light source. For example, the light source 32 may be a fluorescent light, a light emitting diode (LED) 52, an organic LED (OLED), a polymer LED (PLED), a laser diode, a quantum dot LED (QD-LED), a solid-state light, a hybrid of these or any other similar device, and/or any other form of light source. Further, various types of LEDs 52 are suitable for use as the light source 32 including, but not limited to, top-emitting LEDs, side-emitting LEDs, and others. Moreover, according to various examples, multicolored light sources 32, such as Red, Green, and Blue (RGB) LEDs 52 that employ red, green, and blue LED packaging may be used to generate various desired colors of light output from a single light source, according to known light color mixing techniques. In this manner, the light source 32 may be selectively operable to emit lights of different colors including red, green, blue, and light mixtures involving any combination thereof. The LEDs 52 are shown coupled to a printed circuit board (PCB) 54 having an electrical connector 56 with which a wired connection can be made with a vehicle power supply (not shown) or other power supply for supplying electrical power to the one or more LEDs 52. The foregoing components of the light source 32 may be contained within a housing 58 to provide a modular fitment, if desired.

Figure 4:
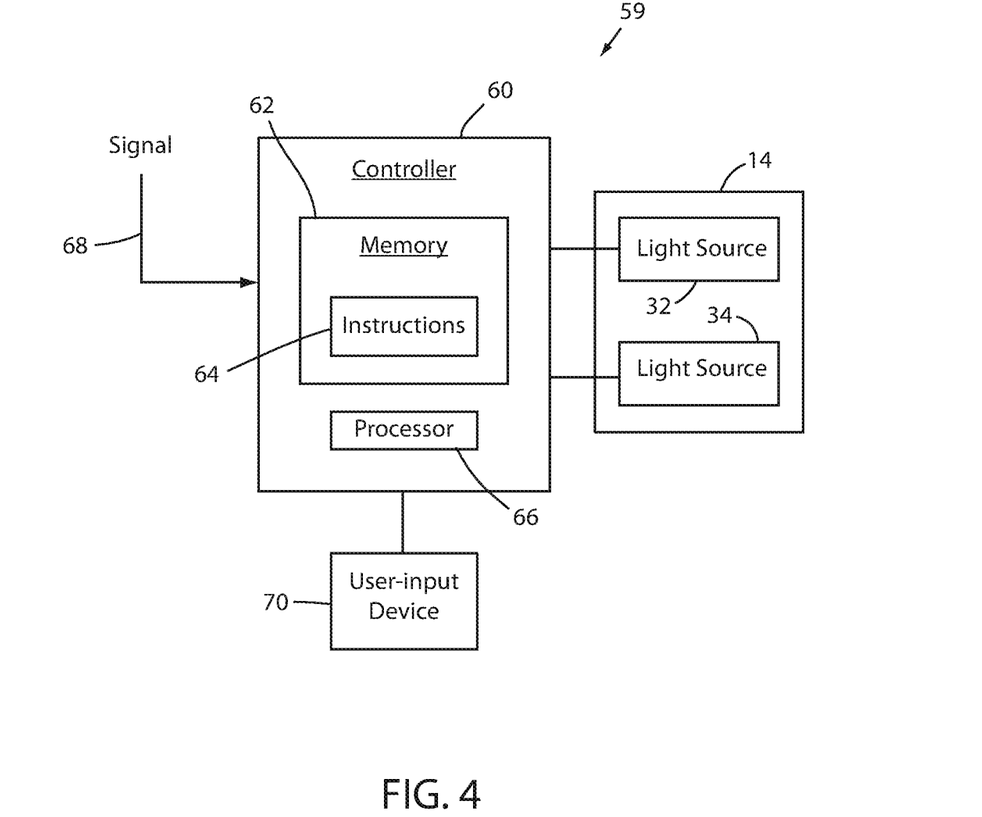
FIG. 4 is a block diagram of a vehicle lighting system including the running board assembly.

Referring to FIG. 4, a vehicle lighting system 59 is shown in which a controller 60 is in communication with the light sources 32, 34. The controller 60 includes a memory 62 having instructions 64 stored thereon that, when executed by a processor 66, control the operation of the light sources 32, 34. The controller 60 may be provided in the running board 14 or elsewhere on the vehicle 12. Furthermore, the controller 60 may be a dedicated controller or a controller tied to other vehicle features. As will be described herein in greater detail, the controller 60 is configured to operate the light sources 32, 34 based on a signal 68 indicating a selected mode of the vehicle 12. Such modes include, but are not limited to, an occupant welcome or farewell mode, a vehicle drive mode, and a vehicle off-road mode.

In one exemplary scenario, the controller 60 operates the light sources 32, 34 based on the signal 68 indicating the occupant welcome or farewell mode. Regarding the occupant welcome mode, the signal 68 may be generated when a vehicle occupant approaching the vehicle 12 unlocks the doors of the vehicle 12 or remote starts the vehicle 12 using a key fob or other remote device, for example. Conversely, regarding the farewell mode, the signal 68 may be generated when the vehicle ignition is turned off and/or a door of the vehicle 12 is unlocked while the vehicle occupant is still inside the vehicle 12. During the occupant welcome or farewell mode, the running board 14 is moved to the deployed position as shown in FIG. 1. When the running board 14 is in the deployed position, the controller 60 operates the light sources 32, 34 to emit light of the same color or a different color. It is contemplated that the color of light emitted by each of the light sources 32, 34 may be specified via a user-input device 70 (FIG. 4) communicatively coupled to the controller 60. For example, light source 32 may be operated to emit light expressed in a white color whereas light source 34 may be operated to emit light in a red color to mirror the color of light emitted by the headlights and taillights, respectively, of the vehicle 12. It is contemplated that the light sources 32, 34 may be operated at a relatively high intensity during the welcome or farewell mode. The user-input device 70 may be an onboard device such as a touchscreen or a remote device such as a smartphone. Other examples of the user-input device 70 may include a knob, switch, and the like.

Figure 5:
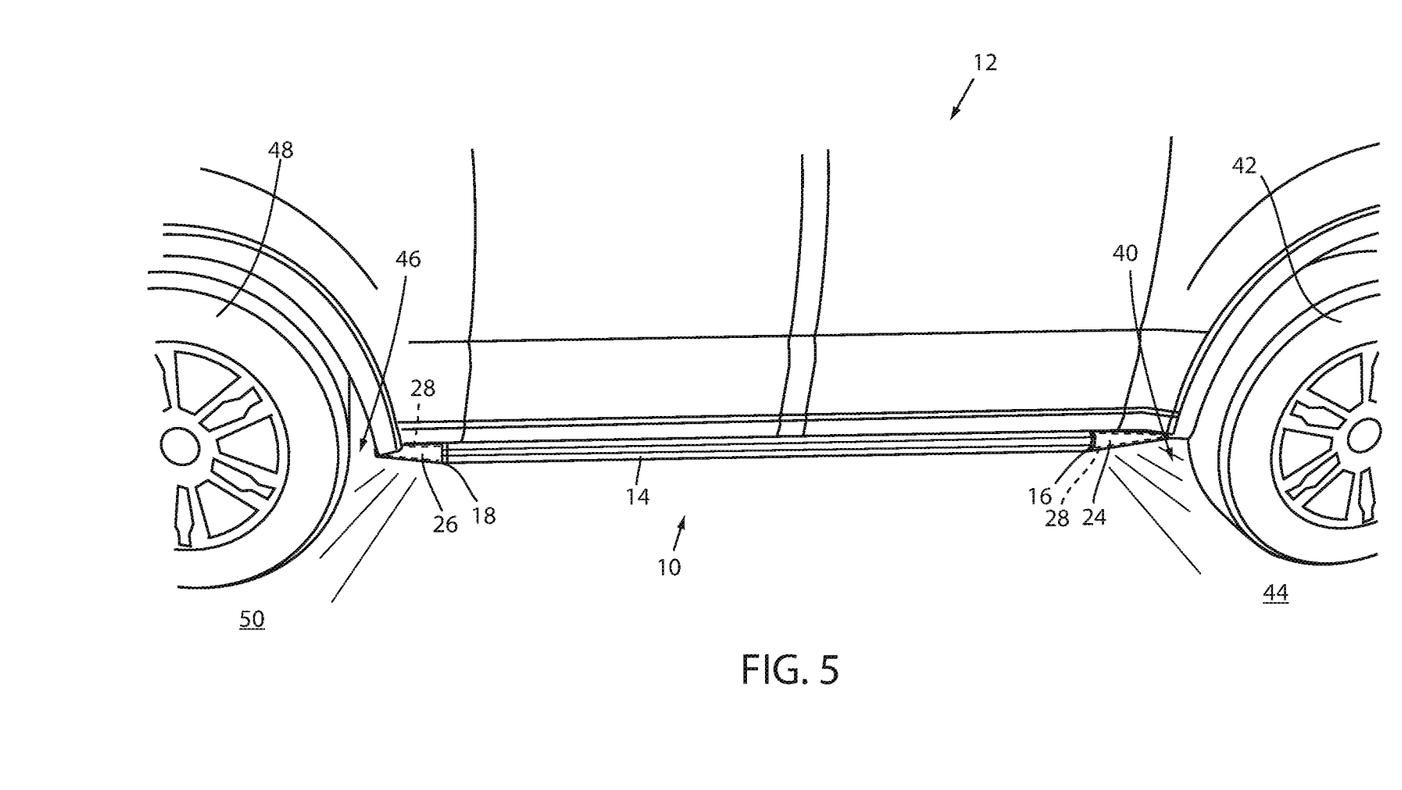
FIG. 5 is a partial side view of the vehicle showing the running board in a retracted position.

In another exemplary scenario, the controller 60 operates the light sources 32, 34 based on the signal 68 indicating the vehicle drive mode. As defined herein, the vehicle drive mode generally corresponds to normal operation of the vehicle 12 along a road such as a street, highway, and the like. Regarding the vehicle drive mode, the signal 68 may be generated via the user-input device 70 or from one or more devices/systems onboard the vehicle 12. During the vehicle drive mode, the running board 14 is in a retracted position as exemplarily shown in FIG. 5 and the controller 60 operates the light sources 32, 34 to function as auxiliary side marker lights. The color of light emitted by each of the light sources 32, 34 may be limited pursuant to vehicle regulations. For example, the light sources 32, 34 may be operated to each emit light expressed in an amber color during the vehicle drive mode. As described herein, light emitted from the light sources 32, 34 generally illuminates a corresponding wheel well area 40, 46 and may additionally illuminate a corresponding ground area 44, 50 below each wheel well area 40, 46. It is contemplated that the light sources 32, 34 may be operated at a lower intensity during the vehicle drive mode as compared to the occupant welcome or farewell mode. In order increase illumination, the end caps 24, 26 may extend from the ends 16, 18 of the running board 14. As provided herein, optics 28 may be disposed within each respective end cap 24, 26. In some examples, the end caps 24, 26 may have a tapered profile, which in conjunction with the optics 28, direct light emitted from the light sources 32, 34 in a predefined direction, such as outward forming the side marker light and/or downwardly/inwardly to illuminate a portion of the vehicle 12.

In yet another exemplary scenario, the controller 60 operates the light sources 32, 34 based on the signal indicating the vehicle off-road mode. Regarding the vehicle off-road mode, the signal 68 may be generated via the user-input device 70. During the vehicle off-road mode, the running board 14 is in the retracted position (e.g., FIG. 5) and the controller 60 operates the light sources 32, 34 to emit light of variable intensity and having the same or a different color. The color of the light emitted by the light sources 32, 34 may be specified using the user-input device 70. For example, the emitted light from the light sources 32, 34 may be expressed as white light. Additionally, the operation of the light sources 32, 34 may be limited by the speed of the vehicle 12. For example, the controller 60 may only operate the light sources 32, 34 to emit light at speeds of 25 miles per hour or less. It is contemplated that the speed limit may be specified via the user-input device 70, if desired.

A variety of advantages may be derived from the use of the present disclosure. For example, use of the disclosed running board assembly allows for alimentation proximate a side portion of the vehicle. The running board assembly may be utilized for functional as well as aesthetic purposes. The assembly described herein may function at wide tolerances that may occur due to driving and/or environmental conditions surrounding the vehicle. The accepting of large tolerances allows the assembly to be manufactured at reduced costs when compared to vehicle lighting assemblies currently available. Moreover, the assembly may be formed from materials that may resist abrasion and/or degradation during use of the vehicle.

According to some aspects of the present disclosure, a running board assembly of a vehicle is provided and includes a running board having two ends, each covered by an end cap having an optic. Two light sources are disposed inside the running board and are each located proximate a corresponding end cap. Each light source is operable to emit light toward the optic of the corresponding end cap based on a signal indicating a selected mode of the vehicle. Examples of the running board assembly can include any one or a combination of the following features:

- each end cap is snappely coupled to a corresponding one of the two ends;
- the running board is movable between a retracted position and a deployed position;
- light emitted by each light source is projected outward from the running board via the optic of the corresponding end cap in one of a vehicle-forward direction and a vehicle-rearward direction;
- the emitted light projected from each optic illuminates a corresponding wheel well area of the vehicle;
- the emitted light projected from each optic additionally illuminates a ground area around a tire located in the corresponding wheel well area;
- the selected mode comprises one of an occupant welcome or farewell mode and a vehicle drive mode;
- the selected mode comprises a vehicle off-road mode and the signal is generated via a user-input device; and/or
- operation of the light sources is limited by a speed of the vehicle in the vehicle off-road mode.

According to some aspects of the present disclosure, a method of illuminating a running board assembly of a vehicle is provided herein. The method includes forming a running board having two ends, each covered by an end cap having an optic. The method also includes disposing first and second light sources proximate each corresponding end cap. The method further includes illuminating the first and second light sources towards the optic of the corresponding end cap based on a signal indicating a selected mode of the vehicle.

According to some aspects of the present disclosure, a running board assembly of a vehicle is provided and includes a running board having two ends, each covered by an end cap having an optic. Two light sources are disposed inside the running board and are each located proximate a corresponding end cap. Each light source is operable to emit light toward the optic of the corresponding end cap based on a signal indicating a vehicle off-road mode. Examples of the running board assembly can include any one or a combination of the following features:

- each end cap is snappely coupled to a corresponding one of the two ends;
- light emitted by each light source is projected outward from the running board via the optic of the corresponding end cap in one of a vehicle-forward direction and a vehicle-rearward direction;
- the emitted light projected from each optic illuminates a corresponding wheel well area of the vehicle and additionally illuminates a ground area around a tire located in the corresponding wheel well area;
- the signal is generated via a user-input device; and/or
- operation of the light sources is limited by a speed of the vehicle in the vehicle off-road mode.

According to some aspects of the present disclosure, a vehicle lighting system is provided and includes a running board having two ends, each covered by an end cap having an optic. Two light sources are disposed inside the running board and are each located proximate a corresponding end cap. Each light source is operable to emit light toward the optic of the corresponding end cap. A controller is operably coupled to the light sources and is configured to operate the light sources based on a signal indicating a vehicle off-road mode. A user-input device is configured to generate the signal based on input specifying the vehicle off-road mode. Examples of the vehicle lighting system can include any one or a combination of the following features:

- each end cap is snappely coupled to a corresponding one of the two ends;
- light emitted by each light source is projected outward from the running board via the optic of the corresponding end cap in one of a vehicle-forward direction and a vehicle-rearward direction;
- the emitted light projected from each optic illuminates a corresponding wheel well area of the vehicle and additionally illuminates a ground area around a tire located in the corresponding wheel well area; and/or
- generation of the signal is limited by a speed of the vehicle in the vehicle off-road mode.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor and/or switch examples discussed above might include computer hardware, software, firmware, or any combination thereof to perform at least a portion of their functions. For example, a sensor and/or switch may include computer code configured to be executed in one or more processors, and may include hardware logic/electrical circuitry controlled by the computer code. These example devices are provided herein for purposes of illustration, and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A running board assembly of a vehicle, comprising:
a running board having two ends, each covered by an end cap having an optic, each end cap having a base portion coupled with the running board and an apex disposed outwardly of the base portion; and
two light sources disposed inside the running board and each located proximate a corresponding end cap, wherein each end cap operates to enclose the light sources within the running board, and wherein each light source is operable to emit light toward the optic of the corresponding end cap based on a signal indicating a selected mode of the vehicle.

2. The running board assembly of claim 1, wherein each end cap is snappedly coupled to a corresponding one of the two ends.

3. The running board assembly of claim 1, wherein the running board is movable between a retracted position and a deployed position.

4. The running board assembly of claim 1, wherein light emitted by each light source is projected outward from the running board via the optic of the corresponding end cap in one of a vehicle-forward direction and a vehicle-rearward direction.

5. The running board assembly of claim 4, wherein the emitted light projected from each optic illuminates a corresponding wheel well area of the vehicle.

6. The running board assembly of claim 5, wherein the emitted light projected from each optic additionally illuminates a ground area around a tire located in the corresponding wheel well area.

7. The running board assembly of claim 1, wherein the selected mode comprises one of an occupant welcome or farewell mode and a vehicle drive mode.

8. The running board assembly of claim 1, wherein the selected mode comprises a vehicle off-road mode and the signal is generated via a user-input device.

9. The running board assembly of claim 8, wherein operation of the light sources is limited by a speed of the vehicle in the vehicle off-road mode.

10. A running board assembly of a vehicle, comprising:
a running board having two ends, each covered by an end cap, each end cap having a triangular cross section with base portion coupled with the running board and an apex disposed outwardly of the base portion;
an optic disposed within each end cap, wherein the optics are positioned proximate to the apex of each end caps, respectively; and
two light sources disposed inside the running board and each located proximate a corresponding end cap, wherein each light source is operable to emit light toward the optic of the corresponding end cap based on a signal indicating a vehicle off-road mode.

11. The running board assembly of claim 10, wherein each end cap is snappedly coupled to a corresponding one of the two ends.

12. The running board assembly of claim 10, wherein light emitted by each light source is projected outward from the running board via the optic of the corresponding end cap in one of a vehicle-forward direction and a vehicle-rearward direction.

13. The running board assembly of claim 12, wherein the emitted light projected from each optic illuminates a corresponding wheel well area of the vehicle and additionally illuminates a ground area around a tire located in the corresponding wheel well area.

14. The running board assembly of claim 10, wherein the signal is generated via a user-input device.

15. The running board assembly of claim 10, wherein operation of the light sources is limited by a speed of the vehicle in the vehicle off-road mode.

16. A vehicle lighting system comprising:
a running board having two ends, each covered by an end cap having an optic, the running board terminating below a door of the vehicle and the end cap extending towards a wheel well;
two light sources disposed inside the running board and each located proximate a corresponding end cap, wherein each light source is operable to emit light toward the optic of the corresponding end cap;
a controller operably coupled to the light sources and configured to operate the light sources based on a signal indicating a vehicle off-road mode; and
a user-input device configured to generate the signal based on input specifying the vehicle off-road mode, wherein a color of emitted light is determined via the user-input device.

17. The vehicle lighting system of claim 16, wherein each end cap is snappedly coupled to a corresponding one of the two ends.

18. The vehicle lighting system of claim 16, wherein light emitted by each light source is projected outward from the running board via the optic of the corresponding end cap in one of a vehicle-forward direction and a vehicle-rearward direction.

19. The vehicle lighting system of claim 18, wherein the emitted light projected from each optic illuminates a corresponding wheel well area of the vehicle and additionally illuminates a ground area around a tire located in the corresponding wheel well area.

20. The vehicle lighting system of claim 16, wherein generation of the signal is limited by a speed of the vehicle in the vehicle off-road mode.

* * * * *